Patented June 1, 1926.

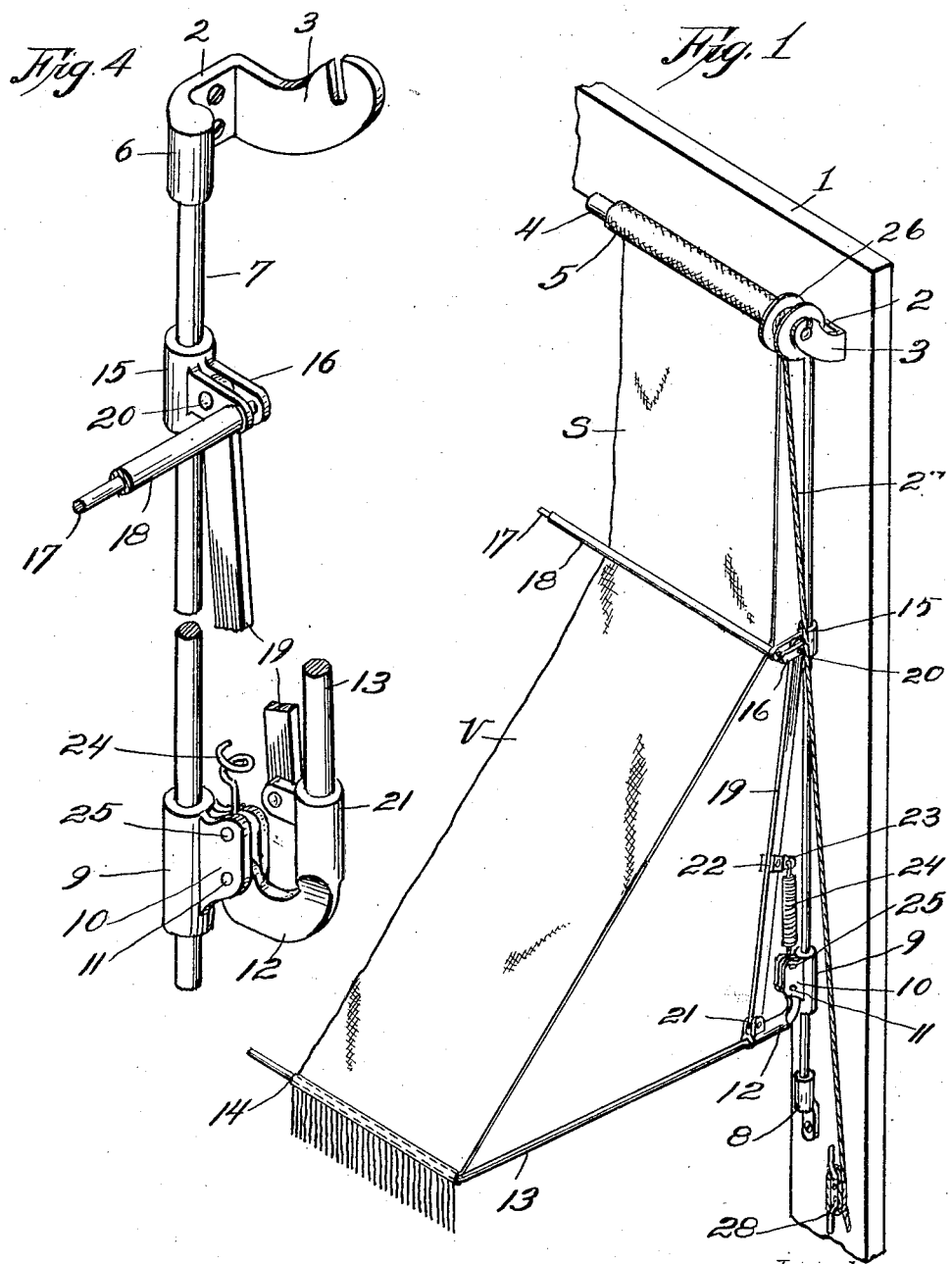

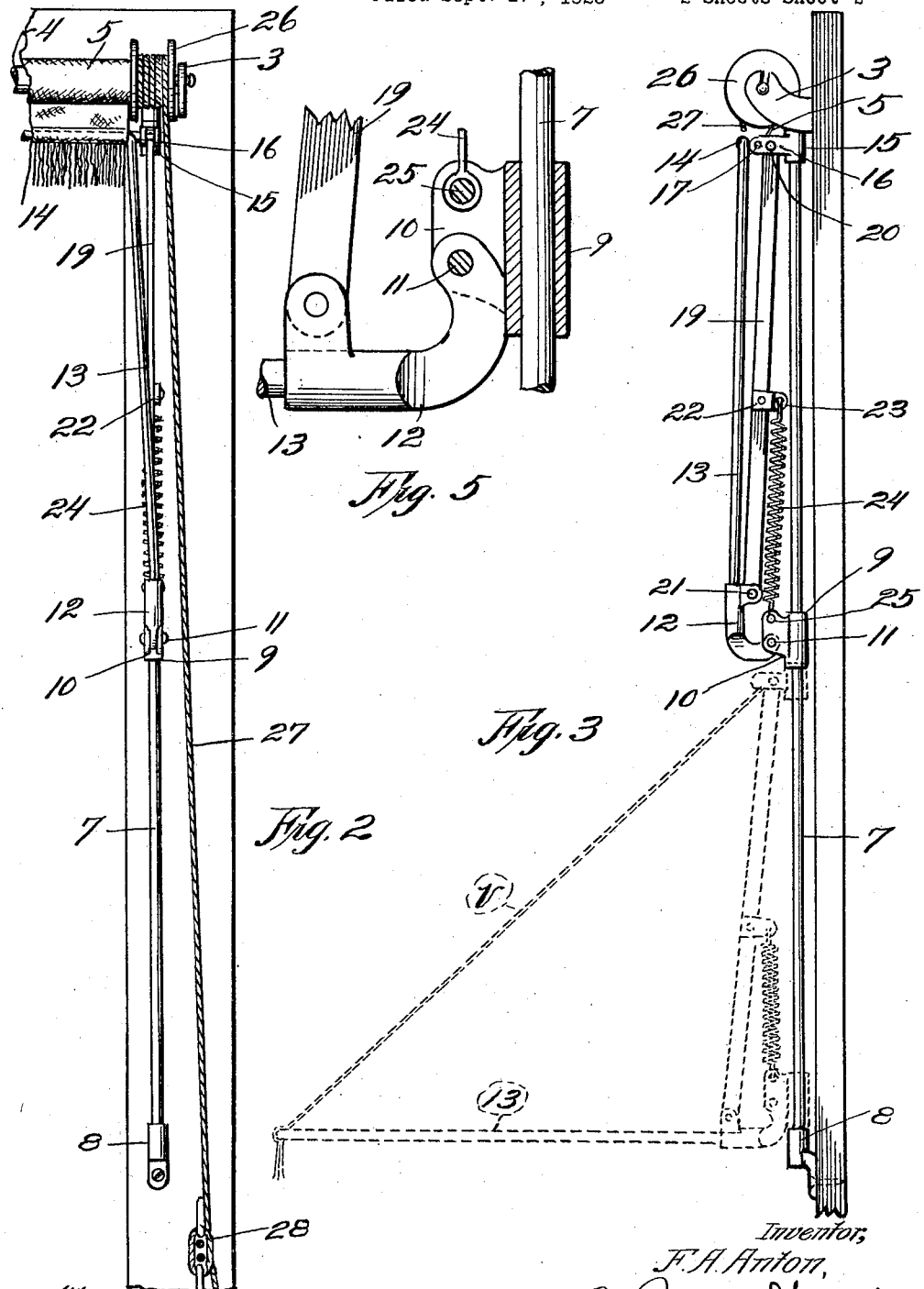

1,587,134

UNITED STATES PATENT OFFICE.

FREDERICK A. ANTON, OF TOPEKA, KANSAS.

WINDOW AWNING.

Application filed September 17, 1923. Serial No. 663,142.

This invention relates to window awnings of that class in which the awning fabric is wound or unwound upon a roller, and adapted in the latter condition, to provide an upright or straight portion and an inclined or visor portion. Heretofore all awnings of this type with which I am familiar, have been incapable of any adjustment for utilizing the fabric as a partial visor, unless the straight portion is fully extended, and the visor therefore opposite the lower half of the window opening.

In such conventional constructions a pull on the controlling rope, results in the gradual shortening of the visor, and not before it has been totally eliminated, is there any shortening of the straight portion of the fabric. With such awnings therefore, the upper half of a window must be fully screened before a visor can be produced and utilized. These awnings when used without the visor portion but otherwise fully or partly spread, shade only the upper part of the window or a fraction thereof, and shut off light and air at the covered part of the window, in fact function like an ordinary window shade.

One awning which has been brought to my attention since the production of my invention, differs from those mentioned as of conventional type, in that it makes provision for utilizing the fully-extended visor at any height, but this construction makes no provision for the use of a narrowed visor, as is frequently desirable, as unless fully extended, the visor frame is free to flap or swing up in windy weather.

This is objectionable to both sight and hearing. Furthermore, where a spring roller is employed, there would be a gradual narrowing and eventual elimination of the visor, as the slack produced in the fabric on each upward puff of wind, would be taken up by the roller, which, in awning construction, exerts a continuous force tending to wind up the fabric.

I have found that if the visor of any desired area, can be utilized opposite any part of the window, a much larger proportion of the window opening is available for the admission of light and circulation of air without admitting sunshine, than with an awning in which a full visor must be employed.

The object of this invention therefore is to provide a construction whereby the visor, adjustable to different sizes, may be available at any level, that is regardless of whether the straight portion is fully or partly extended or fully retracted, and thus in a single structure possess the desirable features of all awnings heretofore produced.

More especially my object is to produce an awning in which, upon the relaxation of the controlling rope, the "straight" portion of the fabric is first fully extended parallel with the face of the window, and then the visor is produced, and in which, when the rope is pulled, the straight portion is rewound without affecting the visor except to raise it bodily to a higher level, and in which, in the event it is desired to reduce the area of the visor, a continued pull on the rope is required after the straight portion is fully rewound to wind part of the visor on the roll. If the contracted visor is desired at a lower elevation, the slacking of the rope accomplishes the result, as it permits the reextension of the "straight" portion to the desired extent without affecting the spread or size of the visor.

Another object of the invention is to produce an awning of the class described, possessing the desirable features of rigidity and strength, and in which the power of retractile springs is utilized to prevent such independent vibration or movement of metal parts as will produce objectionable noise or rattling in windy weather, and with these general objects in view, the invention consists in certain novel features of construction and combinations of parts as hereinafter described and claimed; and in order that it may be more fully understood, reference is to be had to the accompanying drawing, in which:—

Figure 1 is a fragmentary perspective view of an awning embodying the invention, the straight or upright portion of the awning not being fully extended so as to hold the visor correspondingly above its lowest position.

Figure 2 is a fragmentary front elevation showing the awning in fully closed position.

Figure 3 is a side view of the construction as disclosed by Figure 2, and also indicating in dotted lines, the position of the operative parts when the awning is fully lowered.

Figure 4 is a broken detail perspective of certain of the operative parts of the invention.

Figure 5 is a detail vertical section of certain parts as properly related when the visor of the awning is fully extended.

Referring to the drawings in detail, 1 indicates a window, and 2 a pair of brackets secured to the frame and provided with conventional or other suitable arms for the operative support of the spring roller 4 of customary type for exerting a winding force on the fabric or awning proper 5. This spring roller, however, as will hereinafter appear, is not essential for the operation of the awning as certain springs to be later described will maintain the awning taut.

The brackets have cap-ends 6 for the securement of the upper ends of a pair of vertical guide rods 7, secured at their lower ends by brackets 8 to the frame adjacent its lower corners.

A pair of slides 9 are mounted upon rods 7, and are provided with outwardly-projecting bifurcated ears 10. Pivoted at 11 to and between ears 10 are a pair of substantially L-shaped fittings 12, constituting the extremities of the arm portions 13 of a U-shaped visor frame, the bridge or cross portion 14 of which is secured to the lower extremity of the awning fabric.

Mounted on the vertical guides 7 is a pair of slides 15, having outwardly-projecting bifurcated lugs 16. A cross-rod 17 is supported by the said lugs and at all times applies pressure at the outer face of the fabric, the engagement being with but little friction as a roller 18 on the rod comes in direct contact with the fabric. This cross-rod defines the bottom of what I term the "straight" or shade portion of the fabric, and the top of the "visor" or peak portion of the fabric, and changes in the position of slides 15 relative to the slides 9, for a reason which will hereinafter appear, it being noted in this connection that the portions of the fabric respectively referred to as the "straight" and "visor" portions are identified by the characters S and V.

A pair of connecting bars 19 are pivoted at their upper ends at 20 to the lugs 16, and slope slightly downward and outward therefrom and are pivoted to the arms of the U-shaped visor frame, preferably at 21 to lugs of fittings 12, it being noted by reference to Figure 3, that the pitch of the inclined bars 19 increases as the "visor" frame swings downward. Forked clips 22 are secured to the bars 19 and have ears 23 vertically over lugs 10, and retractile springs 24, connect the said ears with cross-pins 25, carried by said lugs. The springs 24 are always under tension and through their bars 19 constantly tend to swing the U-frame 13 downwardly. The force exerted by the U-frame, however, is counteracted by the tension or upward pull on the fabric exerted by the spring rollers 4 and also by the friction incident to the operation of the various parts of the awning. When the awning is open the spring roller 4 is at its greatest tension, while the springs 24 are at their least tension, but the parts are held in equilibrium in any position of adjustment due to the fact that the gravitative effect of the U-frame assists the springs 24 when the visor is fully extended. As the U-frame is collapsed through rolling up the awning by pulling on the pull rope and thus manually overcoming the downward torque of the U-frame and of the force of the springs 24, the tension of the springs 24 increases to counterbalance the loss of gravitative effect of the weight of the U-frame, but its lever arm decreases, while the tension of the spring rollers 4 decreases, but its lever arm increases. The parts are thus always in equilibrium, it being understood, however, that the friction of the parts of the awning is sufficient to require a substantial strain in either direction to overcome the counter-balancing forces. The arrest of said slides and consequently of the connecting bars 19, causes the slides 9 to move downward in resistance to springs 24, as the pivotal points 21 at such time describe a curve concentric to pivots 20. Conversely the tension of the springs diminishes as the frame is unfolded to produce a visor. It will be noted that on one end of the roller there is the usual drum 26 and pull cord 27, and the free end of the latter is adapted for engagement with the ordinary window hook 28 to hold the awning in any desired position of adjustment.

When the awning is up, as shown by Figures 2 and 3, it is so supported by the pull cord, and to lower it, the cord is released and the awning slides down on the guides in folded condition until sleeves 9 abut brackets 8. As this occurs the springs 24 exert a downward pressure through bars 19 on the U-frame outward of the pivotal point thereof and thus start the frame on its unfolding pivotal movement and the formation of the visor, and the extent of the unfolding operation and the size of the visor, consequently, can be regulated by the pull rope. If the visor is desired at an intermediate point of the window or at the top thereof, a pull on the rope effects upward travel of the slides 9 and 15 on the guides without attendant pivotal movement of the visor-frame as the tension of the springs 24 exerts sufficient force through the braces 19 on the U-frame to maintain the visor open against the pull of the fabric when it is rolled up through the instrumentality of the pull-rope. This is true because when force on the straight portion S of the awning is exerted, which naturally tends to collapse the visor V, said force is equal to the entire weight of the structure, but is split up into a series of forces through the effect of the cross-rod 17 and roller 18. Due to the resultant force mentioned, a portion of the total weight of the structure is not transmitted to the visor portion V of the fabric, and the force which is actually applied to said visor is overcome by the springs 24 pulling down on the braces 19. The visor thus remains extended while the entire structure travels up the guides. If the U-frame is at the extreme limit of upward travel, continued pulling on the rope, will contract or narrow the visor. When narrowed to the desired degree, say until it is about two-thirds or less extended, the rope can be slackened to permit the slides to move downward until the visor is at the desired elevation, the pull cord being then fastened to the hook to prevent further movement, and it will be noted in this connection that the springs 24, being always under more or less tension, will hold the awning parts firmly in clamped relation and thus guard against rattling noise in windy weather.

An important feature from a practical standpoint of this invention is the freedom from annoying rattling in windy weather, when the visor-frame is in a horizontal position, this being due to the fact that the springs 24 exert such force as to pinch or clamp the upturned ends of the fittings 12 where pivoted to sleeves 9, firmly against the latter, it being noted that said ends of the fittings are so proportioned and formed as to provide for substantial bearing contact on the sleeves. It is possible, in the event a severe wind lifts the visor frame by pressure on the fabric and thereby relaxes the pinching or clamping action, that the sleeves 9, and in some instances sleeves 15 also, will be temporarily raised slightly, and then drop back to normal position, but in such case no rattling noise will be made owing to the fact that the springs maintain the moving parts in yieldingly clamped relation. In fact, it has been found that when the awning is not fully extended or opened, and the fabric is lifted and the slides drop down to a lower position, the springs are brought to a greater tension and thus hold the fabric stretched more tightly than before, this stretching action being intensified after each upward swell imparted to the fabric of the visor by a severe gust of wind. This automatic action is advantageous and desirable, because in stormy weather it is not customary to use an awning in fully lowered position, and with this awning not fully lowered, the lower slides would of course be spaced a greater or lesser distance above the brackets 8 and hence be able to gradually descend until checked by said brackets, leaving the visor frame extending upwardly at a more or less acute angle relative to the window, instead of horizontally, and hence utilizing the weight of the frame supplemented by the force of the more greatly tensioned springs, to stretch the fabric to a greater degree, than if the tendency of the frame to swing downward was checked by abutment of the fittings 12 against sleeves 9.

From the above description it will be apparent that I have produced a window awning embodying the features of advantage enumerated as desirable and which is susceptible of modification in various particulars without departing from the principle of construction or mode of operation involved, or from the spirit and scope of the appended claims.

I claim:

1. A window awning, comprising a roller, a fabric attached at its upper end to the roller, a vertically movable and pivoted U-frame attached to the lower end of the fabric, means spanning the fabric at its outer side vertically below the said roller, connecting means whereby bodily upward or downward movement of the U-frame shall positively impart like movement to said fabric spanning means, and yielding means applying force resistive to that of the roller, and tending to swing the pivoted frame outwardly and downwardly.

2. A window awning, comprising a roller, a fabric attached at its upper end to the roller, a vertically movable and pivoted U-frame attached to the lower end of the fabric, means spanning the fabric at its outer side vertically below the said roller, connecting means whereby all bodily upward movement and upward swinging movement of the U-frame shall impart upward movement to said fabric spanning means, yielding means applying force resistive to that of the roller, and tending to swing the pivoted frame outwardly and downwardly, and means for positively arresting downward and outward swinging movement of the U-frame when it has attained a substantially horizontal position.

3. A window awning, comprising a roller, a fabric attached at its upper end to the roller, a vertically movable and pivoted U-frame attached to the lower end of the fabric, means spanning the fabric at its outer side vertically below the said roller, connecting means whereby all bodily upward movement of the U-frame shall impart like movement to said fabric spanning means, and yielding means movable bodily with the U-frame as the same moves upward, and applying force, resistive to that of the roller, tending to swing the pivoted frame outwardly and downwardly.

4. A window awning, comprising a roller, a fabric attached at its upper end to the roller, a vertically movable and pivoted U-frame attached to the lower end of the fabric, means spanning the fabric at its outer side vertically below the said roller, connecting means whereby bodily upward movement of the U-frame shall impart like movement to said fabric spanning means, and yielding means movable bodily with the U-frame as the same moves upward, and applying force, resistive to that of the roller, tending to swing the pivoted frame outwardly and downwardly; the pivotal support for the U-frame positively arresting downward and outward swinging movement of the latter when it has attained a substantially horizontal position, and movable upward and downward with the latter in its correspondingly vertical bodily movements.

5. A window awning, comprising a roller, a fabric attached at its upper end to the roller, a vertically movable and pivoted U-frame attached to the lower end of the fabric, means spanning the fabric at its outer side vertically below the said roller, connecting means whereby bodily vertical movement of the U-frame shall impart like movement to the said spanning means, and yielding means to cause the connecting means to apply downward pressure on the U-frame tending to swing the latter outward and downward.

6. A window awning, comprising a roller, a fabric attached at its upper end to the roller, a vertically movable and pivoted U-frame attached to the lower end of the fabric, means spanning the fabric at its outer side vertically below the said roller, connecting means whereby bodily upward movement of the U-frame shall impart like movement to said fabric spanning means, yielding means applying force resistive to that of the roller, and tending to swing the pivoted frame outwardly and downwardly, and means for positively arresting upward movement of the spanning means to cause the U-frame if in opened position, to swing upward toward a closed position upon continued fabric winding movement.

7. A window awning, comprising a roller, a fabric attached at its upper end to the roller, a vertically movable and pivoted U-frame attached to the lower end of the fabric, means spanning the fabric at its outer side vertically below the said roller, connecting means whereby bodily vertical movement of the U-frame shall impart like movement to the said spanning means, yielding means to cause the connecting means to apply downward pressure on the U-frame tending to swing the latter outward and downward, and means for positively limiting downward bodily movement of the U-frame, to cause the latter, if not occupying a horizontal position, to swing downward and outward toward such position under pressure of said yielding means.

8. A window awning, comprising a roller, a fabric attached at its upper end to the roller, a vertically movable and pivoted U-frame attached to the lower end of the fabric, means spanning the fabric at its outer side vertically below the said roller, connecting means whereby bodily vertical movement of the U-frame shall impart like movement to the said spanning means, yielding means to cause the connecting means to apply downward pressure on the U-frame tending to swing the latter outward and downward, means for positively limiting downward bodily movement of the U-frame, to cause the latter, if not occupying a horizontal position, to swing downward and outward toward such position, and a pull rope connection for controlling downward bodily or swinging movement of said U-frame.

9. A window awning comprising a roller and a swing frame and fabric connecting them, vertical guides at opposite sides of the awning, a pair of slides on the guides and affording pivotal support for the ends of the swing frame, a rod spanning the fabric at the outer side thereof, a pair of slides carrying the rod and slidable on the guides, bars connecting the last-named slides with the swing frame, and springs exerting cooperative downward force on the said bars and upward force on the first-named slides.

10. A window awning comprising a roller and a swing frame and fabric connecting them, vertical guides at opposite sides of the awning, a pair of slides on the guides and affording pivotal support for the ends of the swing frame, a rod spanning the fabric at the outer side thereof, a pair of slides carrying the rod and slidable on the guides, bars connecting the last-named slides with the swing frame, springs exerting cooperative downward force on the said bars and upward force on the first-named slides, and means for turning the roller to overcome the gravitative force of and lift the slides and parts carried thereby.

11. A window awning comprising a roller and a swing frame and fabric connecting them, vertical guides at opposite sides of the awning, a pair of slides on the guides and affording pivotal support for the ends of the swing frame, a rod spanning the fabric at the outer side thereof, a pair of slides carrying the rod and slidable on the guides, bars connecting the last-named slides with the swing frame, springs exerting cooperative downward force on the said bars and upward force on the first-named slides, means for positively checking upward movement of the upper sleeves, and means for positively checking downward movement of the lower sleeves.

12. A window awning comprising a roller and a swing frame and fabric connecting them, vertical guides at opposite sides of the awning, a pair of slides on the guides and affording pivotal support for the ends of the swing frame, a rod spanning the fabric at the outer side thereof, a pair of slides carrying the rod and slidable on the guides, bars connecting the last-named slides with the swing frame, springs exerting cooperative downward force on the said bars and upward force on the first-named slides, means for positively checking upward movement of the upper sleeves, means for positively checking downwardly movement of the lower sleeves, and means for turning the roller to overcome the gravitative force of and lift the slides and parts carried thereby.

13. A window awning, a roller, a fabric attached at its upper end to the roller, vertical guide rods at opposite sides of the fabric, a pair of sleeves slidable on said rods, a U-frame pivoted to said sleeves for swinging in a vertical plane, a second pair of sleeves slidable on said rods and disposed above the first-named sleeves, a rod spanning the fabric at the outer side and supported at its ends from said second pair of sleeves, and a pair of bars extending downward and outward with respect to said guide rods and pivoted at their upper ends to said second pair of sleeves and at their lower ends to the arms respectively of the U-shaped frame at a point intermediate the pivotal point thereof and the point of connection therewith of the said fabric.

14. A window awning, comprising a roller at the upper end of the window opening, a guide secured adjacent said window opening, a U-frame bodily movable and pivoted to said guide, a fabric attached at its upper and lower ends respectively to said roller and the bridge portion of the U-frame, a rod spanning the fabric at its outer side at a point between the roller and the point of attachment of the fabric with the U-frame, and a pair of bars inclining downwardly and outwardly and constituting pivoted links between the spanning bar and the arms of the U-frame and adapted to positively transmit movement from either one of said parts to the other.

In witness whereof I hereunto affix my signature.

FREDERICK A. ANTON.